United States Patent [19]

Hack

[11] 3,927,909
[45] Dec. 23, 1975

[54] APPARATUS FOR TRANSPORTING AND ADJUSTING ROTATIVE WORKPIECES

[75] Inventor: Heinrich Hack, Spachbruecken, Germany

[73] Assignee: Firma Carl Schenck AG, Darmstadt, Germany

[22] Filed: Sept. 23, 1974

[21] Appl. No.: 508,345

Related U.S. Application Data

[63] Continuation-in-part of Ser. No. 335,079, Feb. 23, 1974, abandoned.

[30] Foreign Application Priority Data

May 6, 1972 Germany.......................... 2222336

[52] U.S. Cl................ 294/81 R; 294/67 R; 294/88
[51] Int. Cl.²........................................... B66C 1/42
[58] Field of Search........... 294/67 R, 67 B, 67 BB, 294/67 BC, 81 R, 81 SF, 88, 106, 119; 214/1 P, 1 CM, 338, 340

[56] References Cited
UNITED STATES PATENTS 2,692,159  10/1954  Croswell et al. .................. 294/81 R
3,076,673  2/1963  Kaplan et al. ..................... 294/81 R
3,363,929  1/1968  Nelson ............................. 294/88

FOREIGN PATENTS OR APPLICATIONS 845,303  8/1960  United Kingdom.............. 294/81 R Primary Examiner—Evon C. Blunk
Assistant Examiner—Johnny D. Cherry
Attorney, Agent, or Firm—W. G. Fasse; W. W. Roberts

[57] ABSTRACT

This apparatus for transporting and adjusting the position of a rotatable longitudinal, flexible workpiece such as a transmission shaft or the like, includes a pair of gripping means positioned to hold and reinforce the ends of the workpiece. The gripping means comprise a pair of grippers defining an internal contour conforming to the external shape of the ends of the workpiece being held, for example, the ends may be universal joints secured to a shaft. The gripping means are supported by telescoping cross support arms extending parallel to the rotative workpiece and adjustable along a common longitudinal axis to avoid applying any bending moments to the workpiece.

6 Claims, 5 Drawing Figures

APPARATUS FOR TRANSPORTING AND ADJUSTING ROTATIVE WORKPIECES

The present application is a continuation-in-part application of my copending application Ser. No. 335,079 filed Feb. 23, 1974, now abandoned.

BACKGROUND OF THE INVENTION

The present invention relates to an apparatus for transporting and adjusting rotatable workpieces which are to be balanced, for example, long shafts or the like. The apparatus includes gripping means or pairs of interconnected grippers. The present mechanism is especially suitable for the transporting and adjusting of rotational bodies such as universal joint shafts. It is to be understood, that it may also be employed for the transporting and adjusting of other articles, such as long rotors or the like.

German Patent 931,460 discloses a transport mechanism wherein interconnected gripping means perform guided movements in opposite directions between the work stations involved in the transport. The use of this type of mechanism in combination with a balancing machine for the purpose of moving workpieces to be balanced from one operational station to another station is limited to workpieces which are intrinsically fixed or rigid.

U.S. Pat. No. 3,076,673 (Kaplan et al) discloses a transport mechanism for heavy sheet metal coils wherein horizontal arms are adjustable in parallel to each other. The arms with the holding means attached to their ends form a wide mouthed jaw which is not capable of holding anything when the arms are moved horizontally outwardly because that is how the jaw opens. Similar considerations apply to British Pat. No. 845,303.

OBJECT OF THE INVENTION

In view of the above it is the aim of the invention to achieve the following objects singly or in combination:
to provide a mechanism which permits the transport and adjustment of non-rigid, that is, intrinsically flexible or elastic workpieces which are to be balanced, such as univeral joint shafts;
to precisely position a long, flexible workpiece in a balancing machine in such a manner that the longitudinal axis is maintained on a straight line; and
to grip the ends of a workpiece in such a manner that damage, for example, to the universal joints at the end of a long flexible shaft is avoided.

SUMMARY OF THE INVENTION

According to the invention there is provided a gripping assembly in which each gripping member includes at the respective end of the workpiece a pincer or gripping tongs arrangement which encircles the workpiece ends. Telescoping arms hold the gripping tongs and are movable in and out along a common longitudinal axis whereby the workpiece is straightened out along its own longitudinal axis so that the workpiece is also braced. It is an essential advantage of this invention that it eliminates every intermediate positioning which would require a preliminary adjustment of the movable ends of the workpiece to be balanced. Another advantage is seen in that the non-rigid workpiece to be balanced may be placed into the balancing machine in an adjusted position without any manual assistance directly from a supply pile. Furthermore, the workpiece may now be transported directly from the balancing machine to the processing machine without additional incidental work.

The apparatus of this invention provides a particularly advantageous means for the unimpeded insertion of the workpiece into the respective support means of a balancing or processing machine when the workpiece is slim and elongated such as a Cardan shaft, elongated rotors for electric motors, and shafts for power and work engines operating in the overcritical speed range, for instance turbosuperchargers.

In accordance with the invention the gripping means are linked by telescoping arms which act as a bracing rod extending with its single longitudinal axis in parallel to the longitudinal axis of the workpiece. This feature provides a particularly advantageous arrangement for stretching the workpiece in the longitudinal direction. The force applied to telescope the bracing rod axially, longitudinally outwardly simultaneously serves to align the workpiece. Consequently, the positioning of the bracing rod and the alignment of the workpiece are effected simultaneously.

According to a still further embodiment of this invention, each gripper includes at its workpiece engaging end a set of tongs which encircle and brace the movable part such as a universal joint of the workpiece.

In a particularly advantageous embodiment of this invention, the encircling and straightening or bracing unit comprises a tubular member rigidly secured to the frame structure. At least one of the telescoping arms is axially movable relative to the tubular member with the aid of at least two pairs of guide rollers secured in the tubular member and a guide rod rigidly secured at one end thereof to said one telescoping arm so that the guide rod may move longitudinally back and forth between said guide rollers.

In a further embodiment of the invention, sensors are combined with the gripping means whereby all points of a workpiece to be gripped are gripped simultaneously in a novel manner. Furthermore, the sensors may control the operating mechanisms of the gripping means to limit the gripping force to avoid damage to the workpiece especially its ends.

BRIEF FIGURE DESCRIPTION

In order that the invention may be clearly understood, it will now be described by way of example, with reference to the accompanying drawings, wherein.

DETAILED DESCRIPTION OF EXAMPLE EMBODIMENTS

Figure 1:
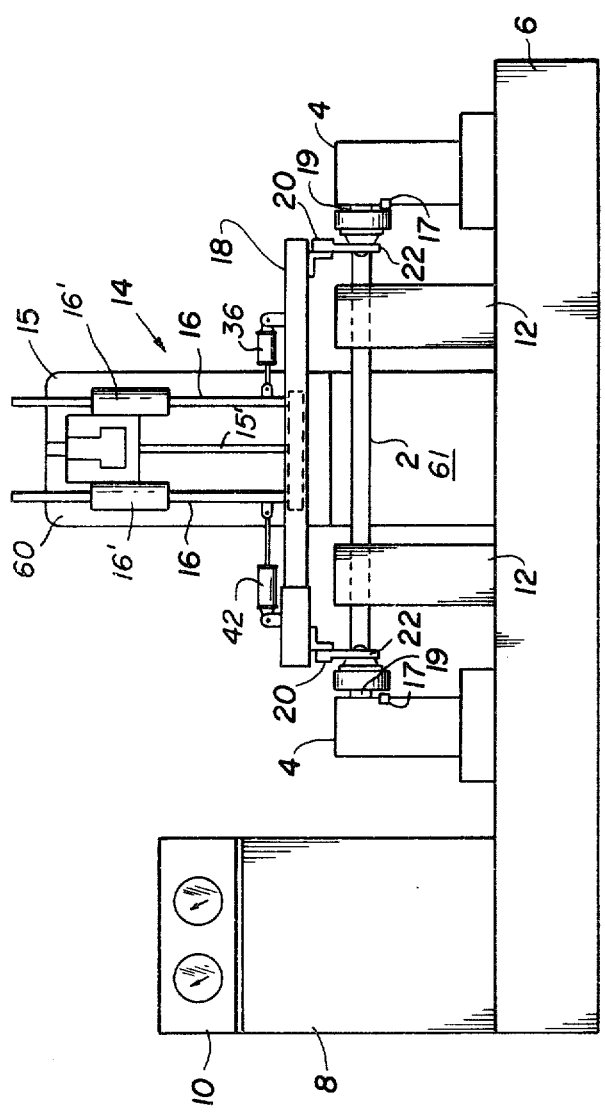
FIG. 1 is a simplified side view of a balancing machine incorporating a transport and adjustment mechanism in accordance with the invention.

FIG. 1 illustrates a balancing machine especially adapted for balancing universal joint shafts 2, including a pair of bearing pedestals 4. The bearing pedestals rotatably support the shaft 2 at its ends by any conventional means. The pedestals 4 are supported on a bench 6. A power unit 8 mounted on one end of the bench 6 is provided with a measuring device 10, which indicates the amplitude and angular position of any imbalance in the shaft 2. The vibration transducers which serve to measure the imbalance and control the measuring device 10 are built into the bearing pedestals 4 and are, therefore, not shown in the drawing. A spot welding installation 12 is mounted on the bench and may be moved lengthwise along the bench to permit the attachment of balancing weights to the universal joint shaft 2 to eliminate its imbalance. Similarly, there may be provided material removing means such as drilling and/or milling tools as is well known.

A transport and adjustment mechanism 14, also mounted above the bench, includes telescoping horizontal cross support arms 18 comprising an arm 18a and an arm 18b telescoping relative to each other along a common longitudinal axis to avoid applying any bending moment to the workpiece. The arms 18 are attached to a pair of vertical arms 16 movable up and down by piston cylinder means 16' held by a frame 15. The up and down movement of the cross arm or cross support 18 is guided in guide means 15' forming part of the frame 15. This cross support 18 serves as a coupling link for two gripping tongs 20, which grip the universal joint shaft 2 at its ends in the region of the universal or Cardan joints 22.

The arms 16 together with the frame 15 are movable horizontally as a unit, for instance, on a machine bed or rail structure not shown but well known in the art. Thus, the frame 15 and all elements carried thereby can be moved crosswise with respect to the bench 6. Further, in a preferred embodiment an upper section 60 of the frame 15 is rotatable relative to a base section 61 of the frame 15. For this purpose the frame sections 60 and 61 may be connected to each other by conventional bearing means, for example, large sleeve bearing means well known and hence not shown. Thus, with the cross support means in a raised position, the upper section 60 of the frame may be rotated by 180° to bring the gripping tongs into a pickup position, for example, above a pile of workpieces to be balanced. Of course, means (not shown) are provided to arrest the upper frame 60 relative to the lower frame base 61 in any desired position.

In view of the foregoing description the transport and adjustment mechanism 14 is capable of picking up, as desired, a workpiece from a supply pile next to the machine, to insert it into the balancing machine, and after balancing of the shaft in the machine, to remove the shaft from the machine. In this procedure, the jaws 24 or 26 of the gripping tongs 20 encircle the universal joints 22 in such a manner that the ends of the universal joint shaft 2 are axially aligned with the universal joint shaft 2 proper.

Figure 3:
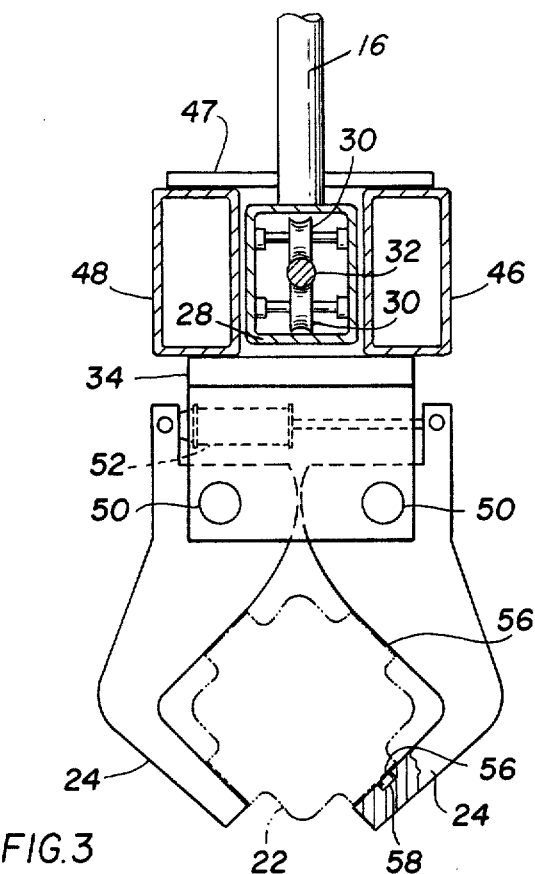
FIG. 3 is a sectional view along section line 3—3 through the mechanism shown in FIG. 2.
Figure 4:
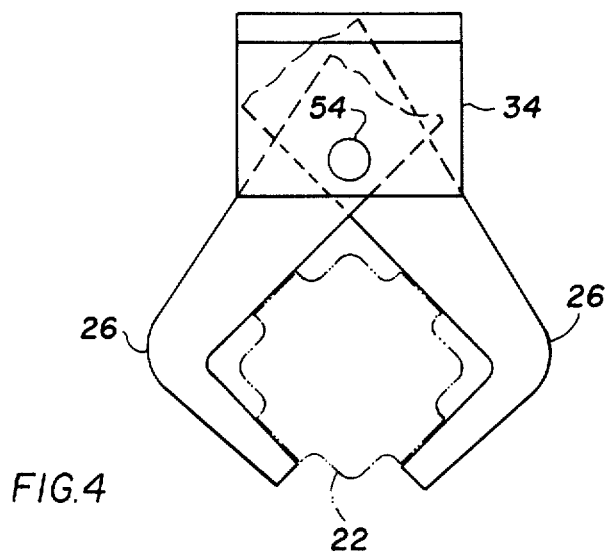
FIG. 4 is a side view of a portion of a gripping tongs assembly somewhat modified as compared to the tongs shown in FIG. 3.

For this purpose, as shown in FIGS. 3 and 4, the jaws 24 or 26 of the gripping tongs 20 have internal negative contours corresponding to the external contours of the universal joint shaft 2 in the region of the universal joints 22. In the embodiments of the invention shown in FIGS. 3 and 4, the external contour of the Cardan joint 22 is essentially square, consequently the closed gripping jaws 24 or 26 have square internal contours.

In order to adjust the rotatable workpiece 2 in the balancing or processing machine, sensors 17 are arranged at the workpiece support means 19 such as chucks of the balancing and/or processing machine, which will receive the workpiece from the jaws 24 or 26. By this means it is possible to achieve an automatic longitudinal alignment prior to securing the workpiece in the chuck means 19 while precluding damage to the workpiece and to the support means.

Figure 2:
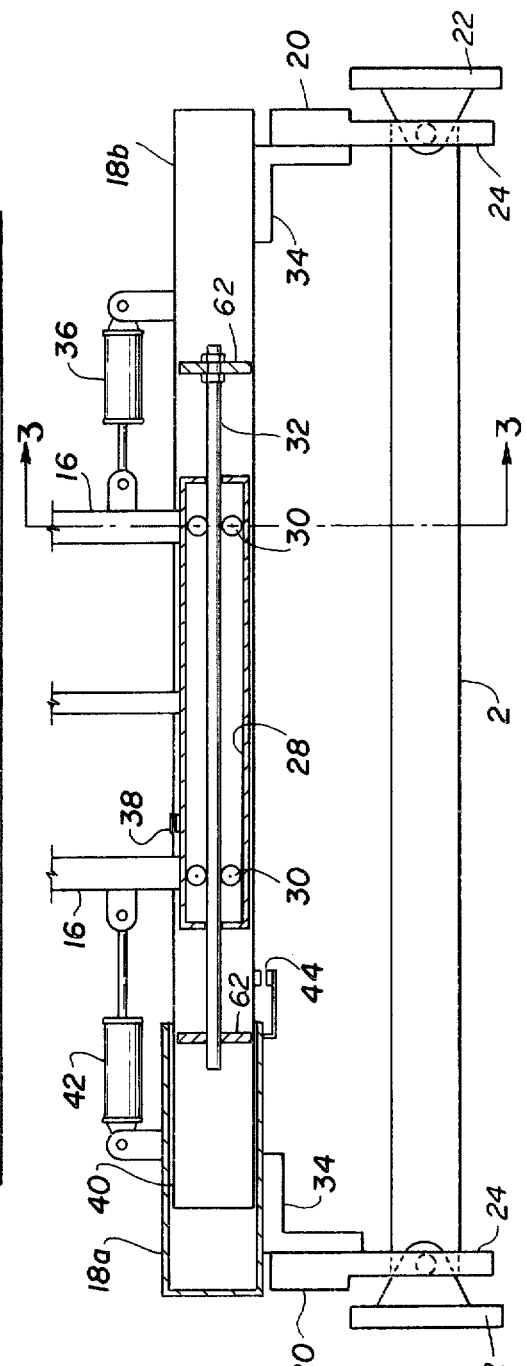
FIG. 2 is a partially cross-sectional view of a transport and adjusting mechanism according to the invention including two gripping tongs and a connecting axial bracing device with telescoping arms having a common longitudinal axis.

Referring to FIG. 2, the two vertical arms 16 are interconnected at their lower ends by a tube 28 which is fitted with two longitudinally spaced apart sets of roller blocks 30. A guide rod 32, which is movable longitudinally with respect to the frame 15, is supported between the rollers of each set of roller blocks 30. Both ends of this rod 32 are connected to the cross support arm 18b by means of cross pieces 62 rigidly secured to the support arm 18a, for example, by welding. An elbow 34 is mounted under the outer end of the support arm 18a and under the outer end of the support arm 18b. Each elbow supports a separate gripping tongs 20. The structure of the cross support 18 will be described in greater detail with reference to FIG. 3. A hydraulic cylinder 36 which engages arm 16 on the one hand and cross support arm 18b on the other hand and a further hydraulic cylinder 42 connected between the other arm 16 and the telescoping portion 40 of the arm 18a permit the longitudinal telescoping movement of these arms 18a and 18b relative to one another, so that a universal joint shaft 2, which has been picked up by the mechanism, can be first straightened out and then aligned with the chucks of the balancing machine. Suitable conventional sensors 38 serve for controlling said longitudinal telescoping movement along a common longitudinal axis. These sensors are fitted to the tube 28 and on the other hand to the cross support 18 and they may, for instance, be in the form of a conventional contact free proximity switch, or trip dogs or the like.

Since the left hand end of the arm 18b telescopes in the right hand end 40 of arm 18a a proper bracing is assured in combination with the guide means 28, 30, 32 and no bending movement will be applied to the workpiece 2. Sensors 44 are provided for controlling the longitudinal positioning or bracing of the cross support 18. These sensors are indicated only schematically in FIG. 2 and may be provided on the tube 28 and on guide end 40. The sensors 38 and 44 may be connected to suitable conventional controls for controlling the hydraulic cylinder. As shown in FIG. 3, the cross support 18 may comprise two longitudinal tubes 46 and 48 on either side of the tube 28 and held together by cross plates 47 and the elbows 34 in one embodiment of the invention. In the example shown in FIG. 3, the two jaws 24 of a gripping tongs 20 may be pivotally supported on separate axes 50. They are rotatable by means on a common operating force, such as a hydraulic cylinder 52.

In the embodiment shown in FIG. 4, the two jaws 26 have a common axis 54 about which they are rotatable.

The partial cross sectional view of FIG. 3 shows sensors 58 embedded in the jaw surfaces 56 of the gripper jaws 24. These sensors 58, for example, may be load cells or inductive-type pick-up means connected to conventional control means for controlling the movements of the transport and adjustment mechanism 14.

Figure 5:
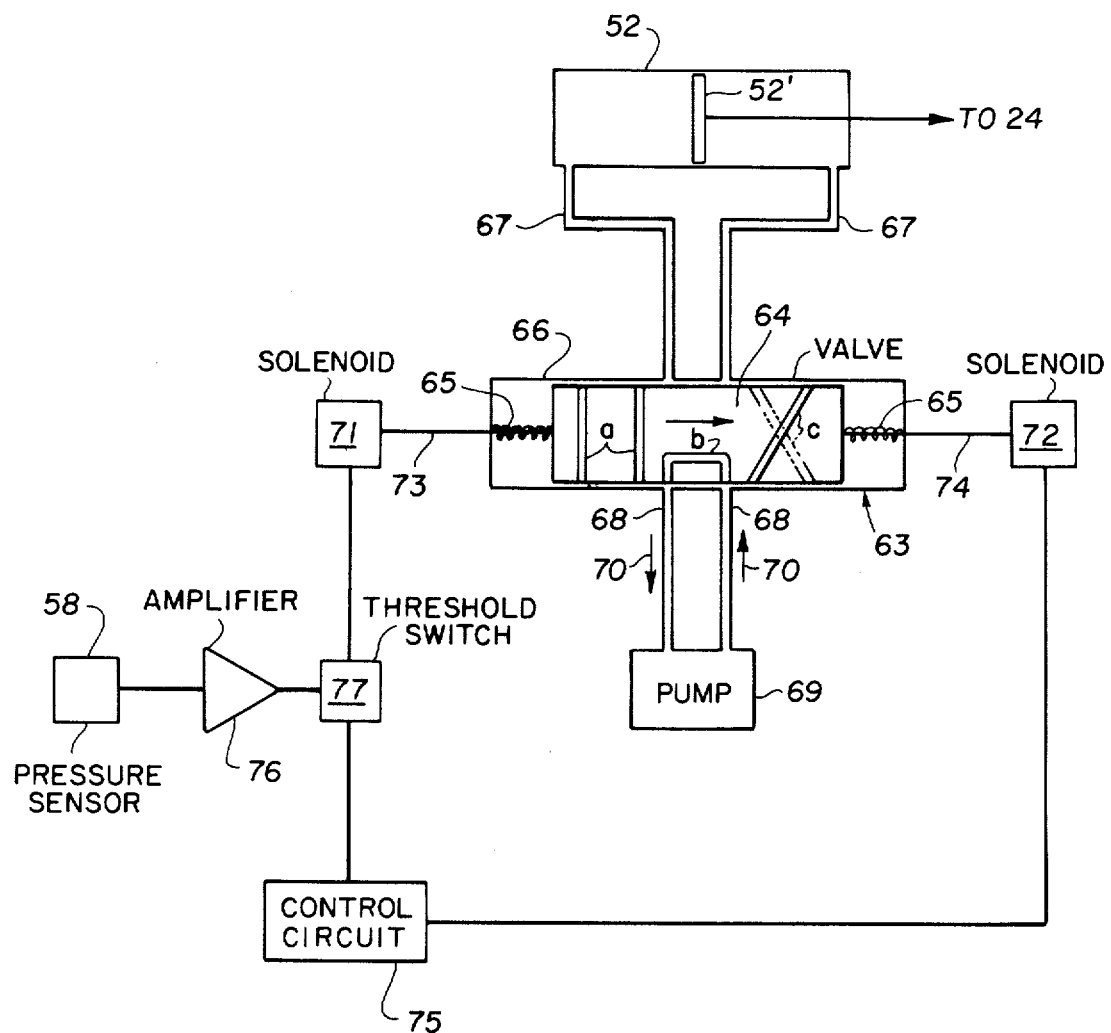
FIG. 5 is a hydraulic and electric control circuit for the operation of the gripping tongs.

It is thereby possible to control the movements of the arms 16 up and down and also the telescoping of the cross support arms 18a and 18b so that these members move only if the gripping tongs 20 have properly picked up or released the shaft 2. Furthermore, the power of the gripping jaws 24 and 26 can be controlled by means of the sensors 58 so that it is assured that the movable universal joint ends 22 of the workpiece 2 which is to be taken up, are aligned longitudinally prior to closing of the work locating fixtures or chucks 19 on the bearing pedestals 4. On the other hand it is possible by the use of the sensors 58 to limit the power of the gripping jaws 24 or 26 to avoid an undesired deformation of or damage to the workpiece, especially its joint ends 22. The sensors employed in the above described invention may be load cells, piezoelectric transducers, spring loaded limit switches, differential transformers and step-by-step switches employed singly or in combination. Referring in this connection to FIG. 5 there is shown a control circuit including hydraulic and electric elements, especially a conventional three-way hydraulic valve 63. The valve 63 has an axially movable valve plug 64 which is shown in its central position. The valve plug 64 is held in the central position by return springs 65 at each end and fits snugly against the inside surface of the valve housing 66. The hydraulic conduits 67 extend between the valve 63 and the cylinder 52 to be controlled for closing and opening the jaws 24. Two further hydraulic conduits 68 extend between a hydraulic pump 69 to the valve housing 66. The parts for the conduits 67 are preferably aligned with the parts for the conduits 68. Three sets of passages a, b, and c extend through the valve plug 64. In the illustrated center position of the valve plug 64, the hydraulic lines 67 are closed, so that pressure is maintained at a desired level on the opposite sides of the piston of the cylinder 52. Further, in this position of the valve plug 64, a continuous fluid flow may be established through the lines 68 and passage b to the pump 69 to avoid undesired loads on the hydraulic pump.

When the valve plug 64 is moved to the right hand position, the hydraulic pump 69 is directly connected to the cylinder 52 through the passes a. The fluid flow is in the direction of the arrows 70 and the piston moves to the left. When the valve plug 64 is moved to the left, the connections between the hydraulic lines 67 and 68 are crossed by passages c so that pressure is applied in the opposite direction and the piston moves to the right. The hydraulic pump will always be working in the same direction.

The movement of the valve plug 64 may be controlled by solenoids 71 and 72. The armatures 73, 74 of the solenoids extend through the housing 66 and are connected to opposite ends of the valve plug 64. The solenoids are connected to a conventional control circuit 75. By energizing the solenoids 71 or 72 the valve plug 64 will move to the left or to the right respectively to thereby move the piston 52 as described above.

In order to limit the pressure applied by the hydraulic cylinder 52 to a workpiece, the pressure sensor 58 such as a load cell is used. The output of the pressure sensor is amplified in an amplifier 76, and applied as a control signal to gate 77 such as a normally closed relay switch or an electronic switch connected in series in the electrical conductors to the solenoid 71. It is assumed that the solenoid 71 controls the three way valve 63 in a direction to close the jaws 24.

In operation, if it is desired to close the jaws 24 with a limited pressure the solenoid 71 is energized to move the valve plug 64 in the desired direction. At the beginning of the operation the switch 77 is closed since there is no pressure applied to the jaws as yet. As the jaws close and a predetermined closing pressure is reached, the sensor 58 provides a control signal to open the switch 77 through the amplifier 76 to thereby deenergize the solenoid 71. Hence the valve plug 64 will return to its shown central position thereby blocking the hydraulic lines E, and thereby maintaining the pressure applied by the cylinder 52 to the jaws 24 at a controlled level. The jaws 24 are opened by energizing the solenoid 72 to move the valve plug 64 in the opposite direction. The springs 65 tend to hold the plug 64 in the center position when the solenoids 71, 72 are deenergized.

In view of the foregoing description it is an important advantage of the invention that the workpieces are inserted into the balancing or processing machine in a precise longitudinal, axial alignment thereby avoiding any sag so that the workpiece may be properly chucked by the respective elements 19 without any further need for an alignment or sag elimination.

Although the invention has been described with reference to specific example embodiments, it is to be understood, that it is intended to cover all modifications and equivalents within the scope of the appended claims.

What is claimed is:

1. An apparatus for handling and precisely positioning long, flexible workpieces or workpieces with portions which are pivotable relative to each other so that their longitudinal alignment is necessary for said positioning, comprising a rigid frame structure, first and second horizontally extending cross support arms having a common longitudinal axis and arranged to telescope one within the other, means movably securing said support arms to said frame structure, said securing means including rigid guide means for said cross support arms to keep said arms in longitudinal alignment with each other, said cross support arms having free ends longitudinally aligned with each other, and gripping tongs operatively secured to said aligned free ends of the cross support arms, whereby a longitudinally effective aligning force may be applied to said workpiece by simultaneously gripping said workpiece at both of its ends, and then extending said support arms longitudinally outwardly.

2. The apparatus according to claim 1, wherein said gripping tongs have an inner contour corresponding to the outer contour of the workpiece at the point where the tongs grip the workpiece.

3. The apparatus according to claim 1, wherein force sensor means are arranged in said tongs for sensing the pressure between the tongs and the workpiece.

4. The apparatus according to claim 3, further comprising tong operating means (52) operatively responsive to said sensor means to limit said pressure.

5. The apparatus according to claim 1, for use in a balancing machine including workpiece support means, comprising sensor means arranged to sense the position of a workpiece relative to the workpiece support means of said balancing machine.

6. The apparatus according to claim 1, wherein said rigid guide means for said cross support arms comprise a tubular member rigidly secured to said frame structure, at least two pairs of guide rollers secured for rotation in said tubular member, and a guide rod rigidly secured to one of said cross support arms in such a position that the guide rod is held between said pairs of guide rollers at spaced points for movement relative to said tubular member.

* * * * *

UNITED STATES PATENT OFFICE
CERTIFICATE OF CORRECTION

Patent No. 3,927,909      Dated December 23, 1975

Inventor(s) Heinrich Hack

It is certified that error appears in the above-identified patent and that said Letters Patent are hereby corrected as shown below:

Related U. S. Application Data

[63] Continuation-in-part of Serial Number 335,079, February 23, 1973, abandoned.

Signed and Sealed this ninth Day of March 1976

[SEAL]

Attest:

RUTH C. MASON
*Attesting Officer*

C. MARSHALL DANN
*Commissioner of Patents and Trademarks*